W. R. HOPKINS.
Barometer.
No. 1,951.
Patented Jan'y 27, 1841.
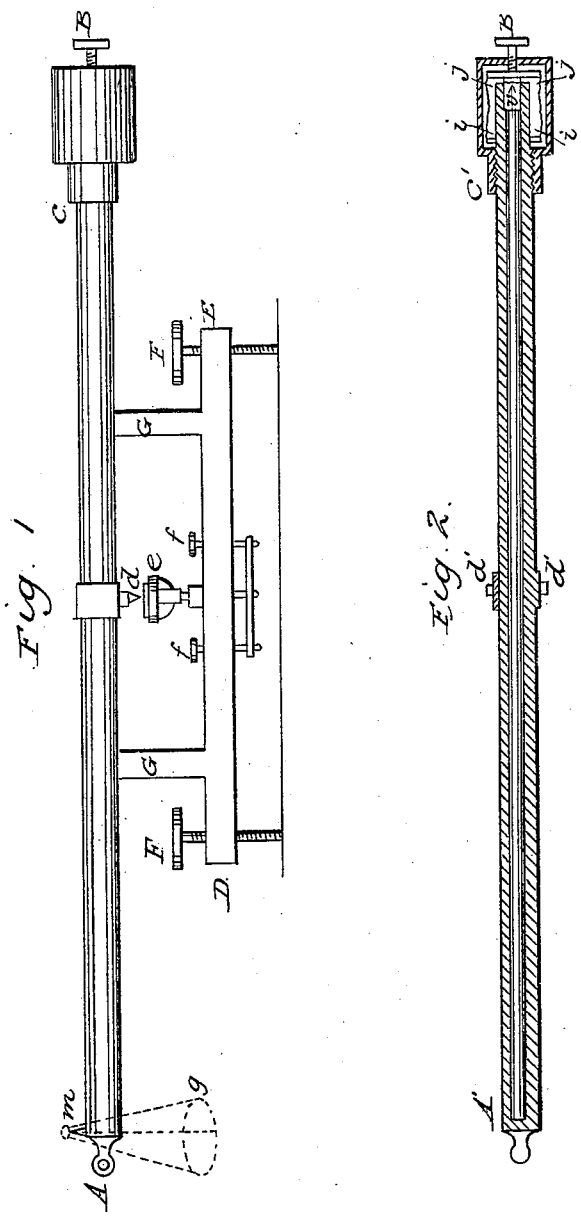
Attest
Mason Gaugher
Sam. H. VerPlanck
Inventor.
W. R. Hopkins

UNITED STATES PATENT OFFICE.

WM. R. HOPKINS, OF GENEVA, NEW YORK.

BAROMETER FOR ASCERTAINING THE RISE AND FALL OF THE MERCURY IN THE TUBE BY THE DIFFERENCE OF WEIGHT.

Specification of Letters Patent No. 1,951, dated January 27, 1841.

*To all whom it may concern:*

Be it known that I, WILLIAM R. HOPKINS, of Geneva, in the county of Ontario and State of New York, have invented a new and Improved Barometer, herein described; and I declare the following to be a full and exact description.

The plan on which the instrument is contrived is that of ascertaining the rise and fall of the mercury in the tube of the instrument by the difference of weight of mercury in the cistern or sack at different times.

The apparatus consists of two parts— a barometer tube and its cistern A, B, (Figure 1) and A', B', (Fig. 2) and weighing stand D E. The barometer tube is composed of some solid material impervious to mercury as steel, iron or porcelain. It should be of a larger diameter than ordinary instruments, the larger the more accurate. The tube should be more than thirty-one inches long and the inside should be made perfectly true and even from end to end. One end should be permanently stopped, as at A (Fig. 2) air tight. The other end should be fitted with a valve ($v$) moved with a screw B (Fig. 2) that can be opened and shut at will; air and mercury tight. This valve projects from a disk ($j\ j$) which has a groove in its edge around which one end of an air tight sack ($i\ j\ i\ j$) is secured. This sack is to contain any mercury not contained in the tube. The upper end of the sack ($i\ i$) is secured to a ring at ($i\ i$) that fits close around the tube. This ring should be of the same diameter of the disk at the lower end of the sack, that this may be perfectly cylindrical and its center of gravity whether partly or wholly full may be kept always at the same distance from the center of the tube (when horizontal). The sack is to be guarded with a box (C B, Fig. 1) of brass, glass, iron or any other material fit for the purpose. The box is to be cylindrical in shape, secured at one end to the tube with a screw as at (C, Fig. 2). The other end is fitted with a strong head, through which passes the screw (B B, Figs. 1 and 2) that opens and shuts the valve ($v$, Fig. 2). This box should not be so tight but that the air can pass readily through its joints to the outside of the quicksilver sack. The tube A B in its exterior center is fitted with a knife edge ($d$), fitted with adjusting screws to be used when the tube is placed horizontally as a scale beam for weighing and the end of the tube (A) is fitted with a small knife edge ($m$) to support the scale pan ($g$).

The weighing stand (D E Fig. 1) has leveling screws F F; an agate plane ($e$) made to rise and fall with screws ($f\ f$) (or in some other way) to raise the tube off the supports (G G) when the weight is tried. Before weighing, the stand should be accurately leveled by means of a spirit level. The scale pan needs no description. Anything that has a good bearing for the knife edge at ($m$) and will hold weights will answer.

To prepare the instrument for use, it is first necessary to ascertain how much an inch of mercury (measured in length in the tube) weighs when transferred to the sack. In other words, we want to know when the mercury in the tube falls an inch (that inch being then transferred to the sack) the tube laid horizontal and used as a scale beam resting on the knife edge ($d$) how much this inch weighs and from this (for the sack is cylindrical as well as the tube is horizontal) how much any number of inches will weigh. The tube is first filled with mercury free from air. Mercury is put into the sack up to the bottom of the valve ($v$). The valve is screwed fast and the tube laid horizontally upon the weighing stand (D E) (this being first accurately leveled). The scale pan is put on and the weight ascertained by putting on weights while the tube rests upon the supporters (G G), then raising the tube off the supports by screwing up the agate plane ($e$) with the screws ($f\ f$) against the knife edge ($d$), just raising it sufficiently to show which end preponderates. If the weight is not exact at first, the tube is again lowered to rest on the supports (G G), the weight altered and so on repeating the process 'till accuracy is obtained. Let us suppose this weight to be 2800 grains; we call this the zero weight as it is the least we can have, for the least quantity of mercury is in the sack (the tube being full). The mercury is now all allowed to pass into the sack leaving the tube empty; the weight is taken as before. Let us suppose this to be 15,200 grains; deducting the zero weight, the mercury in the tube will be found to weigh 12,400 grains (if the tube is thirty one inches long) each inch will contain 400 grains of mercury. The tube is filled as before the same quantity of mercury is put into the sack and the instrument is ready for use.

To take an observation, the instrument is hung up in a perpendicular position, time being allowed for the vibration of the mercury to cease (after the screw B B′ carrying the valve ($v$) has been loosed); the mercury will stand at a point due to the pressure of the atmosphere. The valve is now shut, the tube laid level upon the supports (G G) (and as the mercury can now vibrate in the tube, there being some vacuum there) time must be allowed for the oscillations of the mercury to cease. The weight is taken as above described. Let us suppose this to be 4000 grains, we find by deducting the zero weight that 1200 grains have been added to the weight of the sack which at 400 grains to the inch shows that the mercury has fallen three inches; this deducted, the whole length of the tube (thirty one inches) shows that the weight of the atmosphere equals twenty eight inches of mercury.

What I claim as my invention and desire to secure by Letters Patent, is—

1. The method of ascertaining the height of the mercury in the barometer tube by weighing the quantity remaining in the reservoir or cistern of the barometer.

2. I also claim the sack $i$, $j$, and valve $v$, in combination with the barometer tube by means of which the flow of mercury can at any time be arrested for the purpose of weighing.

WILLIAM R. HOPKINS.

Witnesses:
Wm. G. Ver Planck,
John M. Bradford.